No. 757,813. PATENTED APR. 19, 1904.
J. D. KINNEY.
SEED PLANTER AND FERTILIZER DISTRIBUTER.
APPLICATION FILED NOV. 25, 1903.
NO MODEL. 2 SHEETS—SHEET 1.
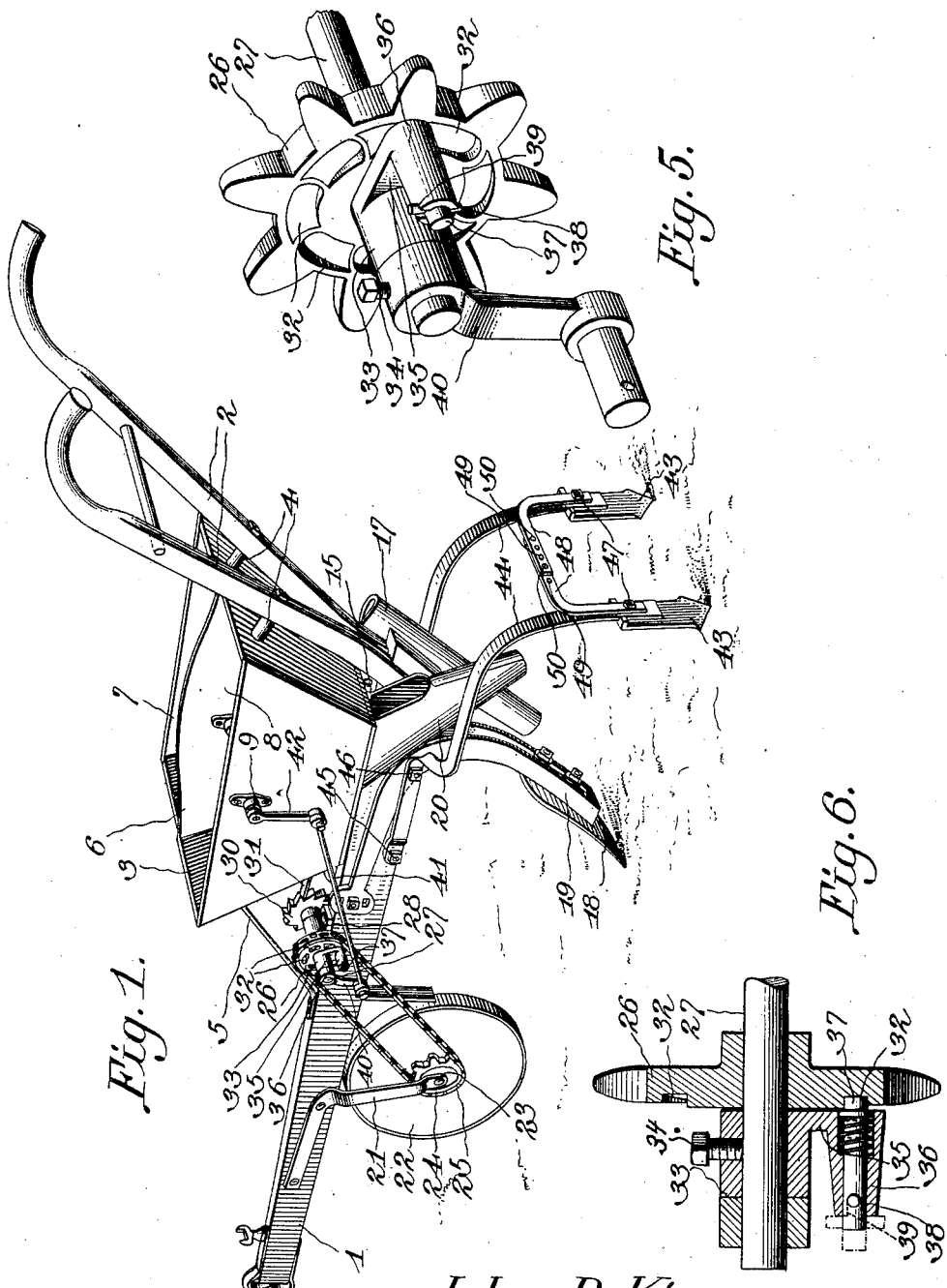
John D. Kinney,
Inventor.
Witnesses
by C. A. Snow & Co
Attorneys

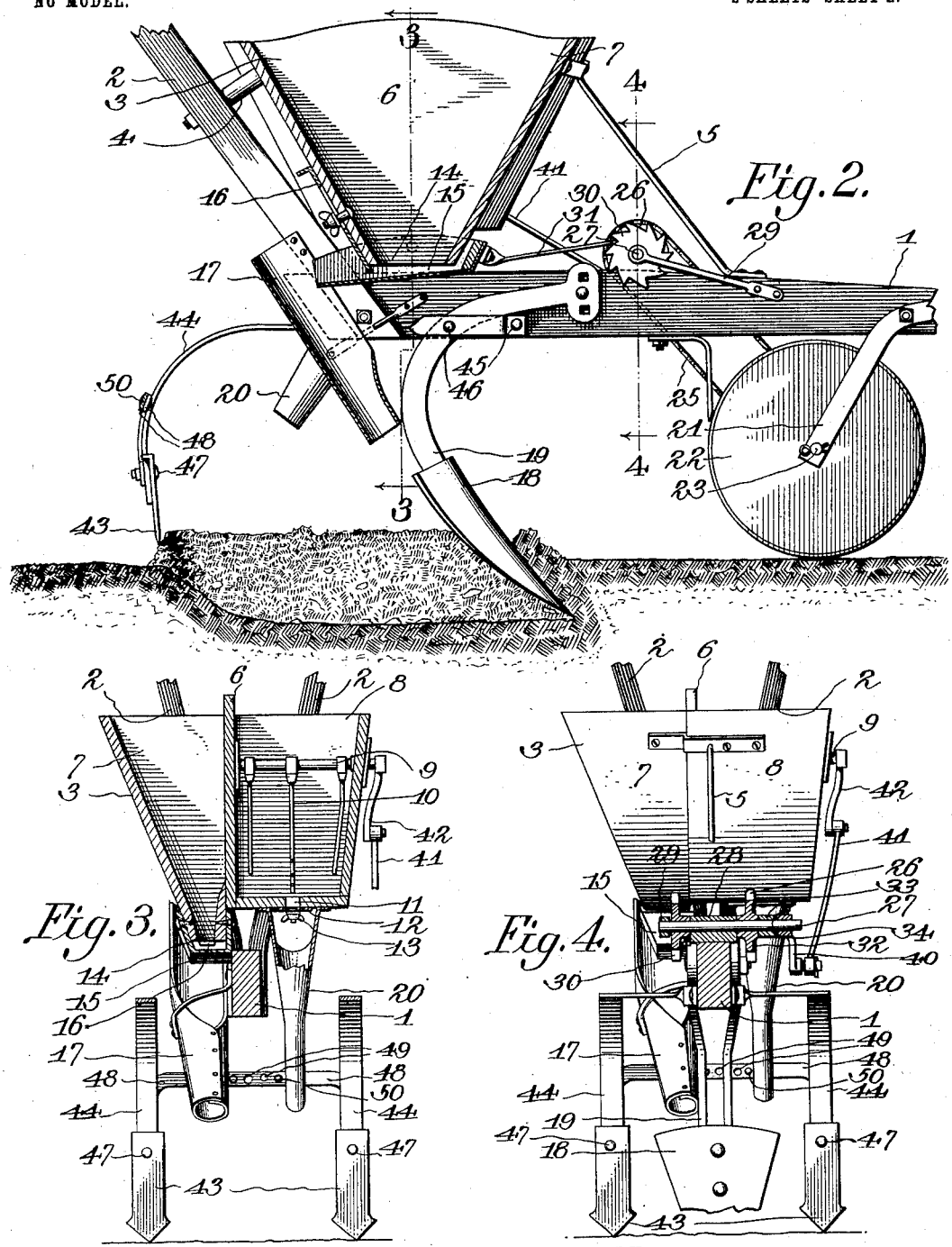

No. 757,813.

Patented April 19, 1904.

UNITED STATES PATENT OFFICE.

JOHN DANIL KINNEY, OF VILLA RICA, GEORGIA.

SEED-PLANTER AND FERTILIZER-DISTRIBUTER.

SPECIFICATION forming part of Letters Patent No. 757,813, dated April 19, 1904.

Application filed November 25, 1903. Serial No. 182,658. (No model.)

*To all whom it may concern:*

Be it known that I, JOHN DANIL KINNEY, a citizen of the United States, residing at Villa Rica, in the county of Carroll and State of Georgia, have invented a new and useful Seed-Planter and Fertilizer-Distributer, of which the following is a specification.

This invention relates to seed-planters and fertilizer-distributers; and it has for its object to provide a device of this class which shall possess superior advantages in point of simplicity, durability, and general efficiency.

With these and other ends in view the invention consists in the improved construction, arrangement, and combination of parts, which will be hereinafter fully described, and particularly pointed out in the claims.

In the accompanying drawings, Figure 1 is a perspective view of a combined seed-planter and fertilizer-distributer constructed in accordance with the principles of my invention. Fig. 2 is a longitudinal vertical sectional view of the same. Fig. 3 is a sectional detail view taken transversely through the hopper. Fig. 4 is a transverse sectional view taken on the line 4 4 in Fig. 2. Fig. 5 is a perspective view, enlarged, of the clutch mechanism for the transmission of motion from the ground-engaging wheel to the seed-dropping and fertilizer-distributing mechanism. Fig. 6 is a detail sectional view, enlarged, of said clutch mechanism.

Corresponding parts in the several figures are indicated by similar numerals of reference.

In the construction of my improved seed-planter and fertilizer-distributer I avail myself of the ordinary beam 1, having handles 2 and a hopper 3, which is supported above the beam, partly by brackets 4, connected with the handles, and partly by a front brace 5. The hopper 3 is usually and preferably divided by a longitudinal partition 6 into two compartments 7 and 8, the former of which in the present instance is used for fertilizing material, while the latter is the seed-compartment. A rock-shaft 9 is journaled in the side walls of the seed-compartment, and said rock-shaft carries agitators composed of radially-extending arms 10 for the purpose of agitating the contents of the seedbox, causing the seed to escape through a slot or opening 11 in the bottom of the box. Under the bottom of the box and in alinement with the slot 11 is the slotted regulating-slide 12, which is secured adjustably by means of thumb-screws 13, so that the width of the escape-opening may be thereby regulated in order to determine the quantity of seed that shall be caused to escape when the machine is in operation.

The fertilizer-compartment 7 has a slot 14 in the bottom thereof, and beneath said slot is pivotally mounted a vibratory shoe 15, which receives the contents of the hopper. Suitably mounted upon the rear side of the hopper is a slide 16, which extends partially into the shoe 15, thereby determining the quantity of fertilizing material which shall be distributed by the machine. The shoe 15 discharges into a chute 17, which is disposed to deliver the charges of fertilizing material directly in rear of the furrow-opener 18, which is mounted upon a standard 19 of ordinary construction, said standard being connected adjustably with the plow-beam in the usual well-known manner. The seed delivered from the seed-compartment of the hopper is likewise delivered into a chute 20, which discharges in rear of the chute 17.

Near the front end of the beam are brackets 21, which support a ground-engaging wheel 22, the axle of which, 23, carries a sprocket-wheel 24, which is connected by a chain 25 with a sprocket-wheel 26, mounted loosely upon a shaft 27, which latter is journaled in a suitable box or bearing 28 upon the beam. 29 is a brace forming an additional bearing for said shaft, and upon the latter, between the brace 29 and boxing 27, is secured a ratchet-wheel 30, engaging an arm or pawl 31, that extends rearwardly from the pivoted vibratory shoe 15. Hence when the shaft 27 is rotated in a forward direction the ratchet-wheel 30 will engage the arm 31, thus imparting a vibratory movement to the shoe 15, and thus operating the fertilizer-distributing mechanism. It is to be noted that the ratchet-wheel 30, the arm 31, and the shoe 15, with its connections, are all to be made particularly stout, and, as regards the arm 31, non-resilient, for the purposes which will be presently more fully set forth.

The sprocket-wheel 26, which has been described as being mounted loosely upon the shaft 27, has in its outer side an annular series of cam-shaped depressions forming ratchet-teeth 32.

33 designates a sleeve or collar secured by means of a set-screw 34 or other suitable means upon the shaft 27 adjacent to the sprocket-wheel 26, and this collar has a radially-extending arm 35, provided with a laterally-extending socket 36, within which is mounted a spring-actuated bolt 37, adapted to engage the ratchet-teeth 32 in the side of the sprocket-wheel. The spring-actuated bolt 37 is extended beyond the socket or casing 36 and is provided with a transverse pin 38 to limit its inward movement, said pin being normally in engagement with oppositely-disposed slots 39 at the outer end of the socket. The shaft 27 has at its outer end a crank 40, which is connected by means of a rod 41 with a longer crank 42 upon the rock-shaft 9, to which latter an oscillatory movement will thus be transmitted.

The device is provided with coverers 43, mounted upon shanks 44, the upper front ends of which are connected with the beam by means of bolts 45 46, one of which also passes through the standard 19, carrying the furrow-opener. The bolts 47, by means of which the blades 43 are secured to their respective standards, also serve for the attachment of a pair of brackets 48, each having perforations 49 for the reception of bolts 50, by means of which the shanks 44 may be adjustably connected. This, it will be perceived, has an advantage, inasmuch as it enables the dirt to be thrown up and to cover the seed with a narrow or a wide ridge, as may be desired.

From the foregoing description, taken in connection with the drawings hereto annexed, the operation and advantages of my invention will be readily understood by those skilled in the art to which it appertains. When the machine is propelled over the field, the ground-engaging wheel 22 will transmit, through the chain 25 and its related parts, a rotary motion to the sprocket-wheel 26. When the machine moves in a forward direction, the ratchet-teeth 32 upon the side of said sprocket-wheel will engage the pin or bolt 37, which through the collar 33 operates to rotate the shaft 27, from which motion will thus be transmitted to the rock-shaft carrying the agitators in the seed-compartment of the hopper. At the same time the ratchet-wheel 30 upon the shaft 27 engages the arm 31 of the shoe 15, thereby vibrating the latter and causing the fertilizing material to be distributed as desired. If for any reason it is desired to "back" the machine, it is obvious that the movement of the ground-engaging wheel will be reversed, and the spring-actuated bolt 37 will then click over the teeth 32, and the movement of the operative parts of the machine will thus be suspended. If, as occasionally happens, the shaft 27 should be gummed or in any way obstructed or if the clutch mechanism should not operate readily, the arm 31 of the hopper 15 will resist the backward rotation of the ratchet-wheel 30 with a degree of force which will assist the clutch mechanism in yielding properly to the backward movement.

When it is desired to transport the machine in a forward direction without operating the parts of the same, it is only necessary to partly withdraw the spring-actuated bolt 37 from the socket or casing 36 and to give it a one-quarter turn until the cross-pin 38 shall rest upon the outer edge of the casing 36. The bolt 38 will thus be temporarily retained out of engagement with the ratchet-teeth 32 of the sprocket-wheel 26, and the latter will thus be rotated loosely upon the shaft 27 while the machine is propelled forwardly. This is desirable not only for the purpose of making the draft easy, but also in order to avoid unnecessary wear upon the working parts of the device.

I desire it to be understood that when desired the machine may be used either for seed-planting or for the distribution of fertilizing material exclusively by simply omitting the partition in the hopper and such parts of the device as relate exclusively either to the seed-distributing or to the fertilizer-distributing mechanism.

Having thus described my invention, I claim—

1. In a machine of the class described, a beam, a hopper supported above the same and having compartments therein, a vibratory shoe mounted below one of said compartments, a shaft journaled transversely upon the beam, a ratchet-wheel upon said shaft, an arm extending forwardly from the vibratory shoe in the path of said ratchet-wheel, a sprocket-wheel mounted loosely upon the transverse shaft, an earth-engaging wheel, means for transmitting motion from the latter to the loose sprocket-wheel, and clutch means for locking the latter upon the transverse shaft.

2. In a machine of the class described, a beam, a hopper supported above said beam, distributing means including a vibratory shoe having a forwardly-extending non-resilient arm, a ground-engaging wheel, a shaft supported transversely upon the beam, means including clutch mechanism for transmitting motion from the ground-engaging wheel to said shaft, and a ratchet-wheel upon said shaft adapted to engage the arm extending from the vibratory shoe.

3. In a machine of the class described, a beam, a hopper supported above the same, distributing means including a vibratory shoe having a forwardly-extending arm and a shaft supported transversely upon the beam, a ratchet-wheel upon said shaft disposed in the path of the arm of the vibratory shoe, a sprocket-wheel mounted loosely upon the transverse shaft and having an annular series of ratchet-teeth in one side thereof, a collar secured upon the shaft and carrying a casing provided with diametrically opposite slots at its outer end, a spring-actuated bolt in said casing engaging the ratchet-teeth in the sprocket-wheel, a pin extending transversely through the beam and normally engaging the slots at the outer end of the casing, a ground-engaging wheel, and means for transmitting motion from the latter to the sprocket-wheel.

4. In a machine of the class described, mechanism to receive motion from the ground-engaging wheel and to transmit motion to the distributing mechanism, said means including a transverse shaft, a sprocket-wheel mounted loosely upon said shaft and receiving motion from the ground-engaging wheel, a collar mounted securely upon the shaft and having an arm carrying a casing, a spring-actuated bolt in the casing normally engaging ratchet-teeth formed upon the side of the sprocket-wheel, means for withdrawing said spring-actuated bolt and temporarily retaining it out of engagement with said ratchet-teeth, a ratchet-wheel upon the transverse shaft, and a non-resilient arm engaging said ratchet-wheel, preventing backward movement of the shaft.

5. In a machine of the class described, a beam, a standard connected with said beam and carrying a furrow-opener, shanks connected with said beam by means of bolts, one of which extends through the standard, covering-blades at the ends of said shanks, and brackets connected with said shanks by means of bolts which also serve for the securement of the covering-blades, said brackets being overlapped and provided with perforations for the adjustable connection of said brackets.

In testimony that I claim the foregoing as my own I have hereto affixed my signature in the presence of two witnesses.

JOHN DANIL KINNEY.

Witnesses:
   J. HENRY POPE,
   W. M. TALLEY.